United States Patent [19]
Harashima et al.

[11] Patent Number: 5,837,793
[45] Date of Patent: Nov. 17, 1998

[54] SILICONE RUBBER POWDER AND METHOD FOR THE PREPARATION THEREOF

[75] Inventors: Asao Harashima, Tokyo; Yoshitsugu Morita; Ryuji Tachibana, both of Chiba Prefecture, all of Japan

[73] Assignee: Dow Corning Toray Silicone Co., Ltd., Tokyo, Japan

[21] Appl. No.: 819,244

[22] Filed: Mar. 17, 1997

[30] Foreign Application Priority Data

Mar. 22, 1996 [JP] Japan ................................. 8-093287
Mar. 22, 1996 [JP] Japan ................................. 8-093288

[51] Int. Cl.[6] .......................... C08G 77/08; C08G 77/14
[52] U.S. Cl. ................... 528/29; 528/15; 528/31; 528/32; 525/477; 525/478; 525/474; 524/588
[58] Field of Search ..................... 528/29, 15, 31, 528/32; 525/477, 478, 474; 524/588

[56] References Cited

U.S. PATENT DOCUMENTS

| | | | |
|---|---|---|---|
| 4,594,134 | 6/1986 | Hamada et al. | 522/99 |
| 4,849,564 | 7/1989 | Shimizu et al. | 524/114 |
| 5,536,782 | 7/1996 | Takarada et al. | 525/100 |
| 5,698,655 | 12/1997 | Chung et al. | 528/29 |
| 5,708,098 | 1/1998 | Cook et al. | 525/477 |

FOREIGN PATENT DOCUMENTS

| | | |
|---|---|---|
| 2036993 | 2/1991 | Canada . |
| 304946 | 3/1989 | European Pat. Off. . |
| 647672 | 4/1995 | European Pat. Off. . |
| 81856 | 3/1989 | Japan . |
| 183726 | 6/1992 | Japan . |

*Primary Examiner*—Margaret W. Glass
*Attorney, Agent, or Firm*—Alex Weitz

[57] ABSTRACT

There is disclosed a silicone rubber powder prepared from a curable silicone composition, said powder comprising a polyorganosiloxane drain having at least one silicon-bonded polyoxyalkylene group of the formula $$-R^1(OR^2)_m OR^3$$

wherein $R^1$ is an alkylene radical, $R^2$ is an alkylene radical, $R^3$ is selected from the group consisting of hydrogen and alkyl radicals and m is an integer having a value of 2 to 100. The rubber powder is preferably prepared by curing the above silicone composition to form a cured silicone rubber and then pulverizing the silicone rubber.

18 Claims, No Drawings

SILICONE RUBBER POWDER AND METHOD FOR THE PREPARATION THEREOF

FIELD OF THE INVENTION

This invention relates to silicone rubber powder and its preparation. More particularly, this invention relates to highly hydrophilic silicone rubber powder that has a soft feel and to an efficient method for the preparation of this silicone rubber powder.

BACKGROUND OF THE INVENTION

Silicone rubber powders are used, for example, as additives for cosmetics, paints, inks, and organic resins. Silicone rubber powders are particularly well-suited for application as a cosmetic additive that provides a smooth feel and as a paint additive for deglossing paint films. These silicone rubber powders are exemplified by silicone rubber powder that contains at least 10 weight % diorganosiloxane blocks (Japanese Patent Application Laid Open [Kokai or Unexamined] Number Sho 59-68333 [168,333/1984]); silicone rubber powder that contains, either free or chemically bonded to the silicone rubber, an epoxy compound that has at least 1 unsaturated hydrocarbon bond in each molecule (Japanese Patent Application Laid Open [Kokai or Unexamined] Number Sho 64-56735 [56,735/1989]); silicone rubber powder that contains, either free or chemically bonded to the silicone rubber, an organosilicon compound bearing a group selected from the epoxy, alkenyl, amino, and mercapto groups (Japanese Patent Application Laid Open [Kokai or Unexamined] Number Sho 64-70558 [70,558/1989]); silicone rubber powder that contains 0.5 to 80 weight % silicone oil (Japanese Patent Application Laid Open [Kokai or Unexamined] Number Sho 64-81856 [81,856/1989]); and silicone rubber powder in which alcoholic hydroxyl is indirectly chemically bonded to silicon (Japanese Patent Application Laid Open [Kokai or Unexamined] Number Hei 3-250050 [250,050/1991]).

However, these silicone rubber powders have a poor flowability and also a poor hydrophilicity and as a result when added to a waterborne cosmetic or paint they either cannot be dispersed to homogeneity or, when a dispersion can be obtained, the silicone rubber powder ultimately separates during storage. In response to this, with the goal of improving the flowability of silicone rubber powder Japanese Patent Application Laid Open [Kokai or Unexamined] Number Hei 7-102075 [102,075/1995] has proposed silicone rubber powder having amorphous silica micropowder immobilized or anchored on the powder surface. Unfortunately, this silicone rubber powder itself has a rough, gritty feel and cosmetics formulated with this silicone rubber powder have a rough, unnatural feel. Silicone rubber micropowder can be prepared by emulsifying a silicone rubber composition in an aqueous surfactant solution and thereafter curing the composition. However, a poor hydrophilicity is exhibited even by the silicone rubber powder prepared using silicon-bonded polyoxyalkylene-functional polyorganosiloxane as this surfactant (Japanese Patent Application Laid Open [Kokai or Unexamined] Number Hei 4-183726 [183,726/1992]).

SUMMARY OF THE INVENTION

An object of the present invention is to provide a highly hydrophilic silicone rubber powder that has a soft feel. Another object of the present invention is to provide an efficient method for the preparation of the said silicone rubber powder.

The present invention, therefore, relates to a cured silicone rubber powder wherein at least one polyoxyalkylene group of the formula $$-R^1(OR^2)_mOR^3$$

is bonded to silicon in the polyorganosiloxane chains that form the rubber powder, where $R^1$ and $R^2$ are independently selected from alkylene, $R^3$ is the hydrogen atom or alkyl, and m is an integer with a value of 2 to 100.

The preparative method according to the present invention comprises pulverizing the above described silicone rubber.

The present invention has been disclosed in Japanese Patent Application Number Hei 08/093287, and Japanese Patent Application Number Hei 08/093288, the full disclosures of which are hereby incorporated by reference.

DETAILED DESCRIPTION OF THE INVENTION

The silicone rubber powder according to the present invention is characterized in that at least one polyoxyalkylene group of the formula $$-R^1(OR^2)_mOR^3$$

is bonded to silicon in the polyorganosiloxane chains that form the rubber powder. $R^1$ in the preceding formula is independently selected from alkylene radical having 1 to 20 carbon atoms and is exemplified by ethylene, propylene, and butylene with ethylene and propylene being preferred. $R^2$ in the preceding formula is also independently selected from alkylene radical having 1 to 20 carbon atoms, which may be the same as or different from $R^1$. Ethylene is preferred for $R^2$. $R^3$ in the formula provided above is the hydrogen atom or alkyl having 1 to 10 carbon atoms, the alkyl radicals being exemplified by methyl, ethyl, and propyl. The subscript m in the formula is an integer with a value of 2 to 100, preferably 5 to 20. The molecular structure of the subject polyorganosiloxane is exemplified by straight-chain, partially branched straight-chain, branched-chain, cyclic, and resin structures with straight-chain and partially branched straight-chain structures being preferred.

The polyoxyalkylene group under consideration is exemplified by the following groups:

—$C_2H_4(OC_2H_4)_mOH$,
—$C_2H_4(OC_2H_4)_mOCH_3$,
—$C_2H_4(OC_2H_4)_n(OC_3H_6)_pOH$,
—$C_2H_4(OC_2H_4)_n(OC_3H_6)_pOCH_3$,
—$C_3H_6(OC_2H_4)_mOH$,
—$C_3H_6(OC_2H_4)_mOCH_3$,
—$C_3H_6(OC_2H_4)_n(OC_3H_6)_pOH$, and
—$C_3H_6(OC_2H_4)_n(OC_3H_6)_pOCH_3$ in which m is an integer with a value of 2 to 100, n is zero or a positive integer, p is a positive integer, and n+p is an integer with a value of 2 to 100. Among these polyoxyalkylene groups, polyoxyalkylene groups whose main chain consists only of the ($OC_2H_4$) repeat unit are preferred for their ability to impart a soft feel and excellent hydrophilicity to the silicone rubber powder. The subject polyoxyalkylene group must be bonded to the silicon in the polyorganosiloxane chains that form the silicone rubber. The curing reaction that forms the silicone rubber is exemplified by the addition reaction between alkenyl and silicon-bonded hydrogen, the condensation reaction between silicon-bonded hydroxyl and silicon-bonded hydrogen, organoperoxide-induced radical reactions, and UV-induced radical reactions. The introduction of the polyoxyalkylene group onto the silicon in the polyorganosiloxane chains that form the silicone rubber powder can be realized, for example, by carrying out the curing reaction in the above-described reaction systems in the presence of polyorganosiloxane whose silicon carries both the polyoxyalkylene group and a group that participates in the particular curing reaction, or by carrying out the curing reaction in the above-described reaction systems in the presence of a polyoxyalkylene compound bearing a group that participates in the particular curing reaction. Alternatively, the subject silicon-bonded polyoxyalkylene-functional polyorganosiloxane is simply contained in the silicone rubber powder and does not participate in the curing reaction that produces the silicone rubber.

The silicone rubber that constitutes the subject silicone rubber powder has a JIS A durometer according to JIS K 6301, for example, preferably of 10 to 50 and more preferably of 20 to 45. The shape of this silicone rubber powder is exemplified by spherical, flattened or disk-like, and amorphous morphologies. The silicone rubber powder will have a spherical or flattened or disk-like morphology when it is produced through spraying or emulsification. The silicone rubber powder will have an amorphous or irregular morphology when it is produced by pulverization. The average particle size of the silicone rubber powder under consideration is, for example, preferably no larger than 500 micrometers and more preferably no larger than 250 micrometers.

The preparative method according to the present invention is characterized by pulverizing a cured silicone rubber which is formed by curing a silicone composition comprising a polyorganosiloxane in which at least one polyoxyalkylene group of the formula —R$^1$(OR$^2$)$_m$OR$^3$ is bonded to silicon, wherein R$^1$, R$^2$, R$^3$ and m have their previously defined meanings. The technique for pulverizing the silicone rubber is exemplified by pulverizing the silicone rubber using a pulverizing or grinding device such as, for example, a stamp mill, bell crusher, roll mill, hammer mill, drum mill, jet mill, and so forth. Pulverization of the silicone rubber is preferably carried out while cooling with, for example, water or liquid nitrogen, since the silicone rubber heats up during pulverization.

The curing reaction in the silicone rubber composition that produces the silicone rubber under consideration is exemplified by the addition reaction between alkenyl and silicon-bonded hydrogen, the condensation reaction between silicon-bonded hydroxyl and silicon-bonded hydrogen, organoperoxide-induced radical reactions, and UV-induced radical reactions. The addition reaction is particularly preferred. The corresponding addition reaction-curing silicone rubber composition preferably comprises:

(A) 100 weight parts of a polyorganosiloxane that contains at least 2 silicon-bonded alkenyl groups in each molecule, (B) a polyorganosiloxane containing at least 2 silicon-bonded hydrogen atoms in each molecule, in a quantity that provides 0.1 to 10 moles silicon-bonded hydrogen from component (B) per 1 mole alkenyl in the present composition, (C) 0.001 to 20 weight parts of at least one polyoxyalkylene-containing component selected from (i) an polyorganosiloxane that contains at least one polyoxyalkylene group of the formula —R$^1$(OR$^2$)$_m$OR$^3$ bonded to silicon or (ii) a polyoxyalkylene compound of the formula R$^4$(OR$^2$)$_m$OR$^3$ wherein R$^1$, R$^2$, R$^3$ and m have their previously defined meanings. R$^4$ is alkenyl and (D) a platinum catalyst in sufficient quantity to cure the composition.

Component (A), which is the base component of the subject silicone rubber composition, is a polyorganosiloxane that has at least 2 silicon-bonded alkenyl groups in each molecule. The molecular structure of component (A) can be, for example, a straight-chain, partially branched straight-chain, branched-chain, cyclic, or resin structure, with straight-chain and partially branched straight-chain structures being preferred. The alkenyl groups in component (A) are exemplified by vinyl, allyl, butenyl, pentenyl, and hexenyl with vinyl being preferred. The non-alkenyl silicon-bonded groups in component (A) are exemplified by the hydroxyl group; alkoxy groups such as methoxy, ethoxy, propoxy, and so forth; and by substituted and unsubstituted monovalent hydrocarbon groups. The substituted and unsubstituted monovalent hydrocarbon groups are exemplified by alkyl such as methyl, ethyl, propyl, and so forth; aryl such as phenyl, tolyl, xylyl, and so forth; aralkyl such as benzyl, phenethyl, and so forth; and haloalkyl such as 3,3,3-trifluoropropyl and so forth. Methyl, phenyl, and 3,3,3-trifluoropropyl are preferred for the non-alkenyl silicon-bonded groups in component (A).

Component (B), which is a crosslinker for the silicone rubber composition, is a polyorganosiloxane having at least 2 silicon-bonded hydrogen atoms in each molecule. The molecular structure of component (B) can be, for example, a straight-chain, partially branched straight-chain, branched-chain, cyclic, or resin structure, with straight-chain and partially branched straight-chain structures being preferred. The silicon-bonded groups in component (B) other than hydrogen are exemplified by the hydroxyl group; alkoxy groups such as methoxy, ethoxy, propoxy, and so forth; and by substituted and unsubstituted monovalent hydrocarbon groups, as described in connection with component (A). Methyl, phenyl, and 3,3,3-trifluoropropyl are preferred for the non-hydrogen silicon-bonded groups in component (B).

Component (B) is added in a quantity that provides from 0.1 to 10 moles, and preferably from 0.5 to 2.0 moles, silicon-bonded hydrogen from component (B) per 1 mole total alkenyl in the silicone rubber composition, that is, per 1 mole of the total alkenyl present in components (A) and (C). A satisfactory cure will not develop when the addition of component (B) provides less then 0.1 mole or more than 10 moles silicon-bonded hydrogen from component (B) per 1 mole alkenyl in the silicone rubber composition.

Component (C) imparts a soft feel and an excellent hydrophilicity to the silicone rubber powder prepared by the cure of the silicone rubber composition.

In a first embodiment, component (i) is a polyorganosiloxane that is free of silicon-bonded alkenyl and silicon-bonded hydrogen and that contains the polyoxyalkylene group with the formula —R$^1$(OR$^2$)$_m$OR$^3$ bonded to silicon, wherein R$^1$, R$^2$, R$^3$ and m are as defined above. The other silicon-bonded groups in this embodiment of (i) are exemplified by the hydroxyl group; alkoxy groups such as methoxy, ethoxy, propoxy, and so forth; and by substituted and unsubstituted monovalent hydrocarbon groups. The substituted and unsubstituted monovalent hydrocarbon groups are exemplified by alkyl such as methyl, ethyl, propyl, and so forth; aryl such as phenyl, tolyl, xylyl, and so forth; aralkyl such as benzyl, phenethyl, and so forth; and haloalkyl such as 3,3,3-trifluoropropyl and so forth. Methyl, phenyl, and 3,3,3-trifluoropropyl are preferred for the other silicon-bonded groups in this embodiment of (i). The molecular structure can be, for example, a straight-chain, partially branched straight-chain, branched-chain, cyclic, or resin structure, with straight-chain and partially branched straight-chain structures being preferred. Component (i) of this first embodiment is exemplified by polyorganosiloxanes with the following formulas.

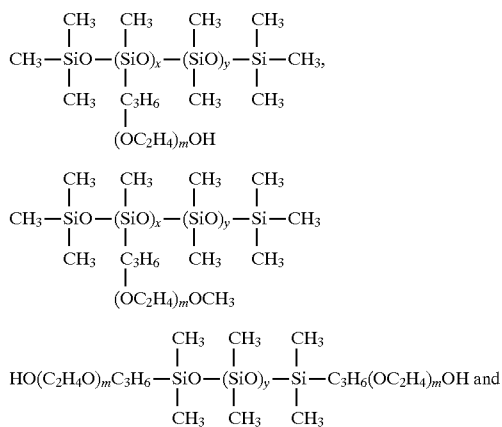

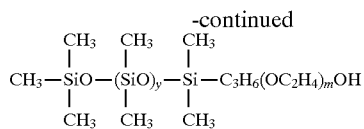

In the preceding formulas, m is an integer with a value of 2 to 100, x is a positive integer, and y is zero or a positive integer.

In a second embodiment, component (i) is a polyorganosiloxane that contains silicon-bonded alkenyl or silicon-bonded hydrogen and that also contains the polyoxyalkylene group with the formula

bonded to silicon, wherein $R^1$, $R^2$, $R^3$ and m are as defined above. The alkenyl in this second embodiment of component (i) is exemplified by vinyl, allyl, butenyl, pentenyl, and hexenyl with vinyl being specifically preferred. The other silicon-bonded groups in this embodiment of component (i) are exemplified by the hydroxyl group; alkoxy groups such as methoxy, ethoxy, propoxy, and so forth; and by substituted and unsubstituted monovalent hydrocarbon groups as described in connection with component (A), supra. The molecular structure of component (i) can be, for example, a straight-chain, partially branched straight-chain, branched-chain, cyclic, or resin structure, with straight-chain and partially branched straight-chain structures being preferred. Component (i) according to this second embodiment is exemplified by polyorganosiloxanes with the following general formulas.

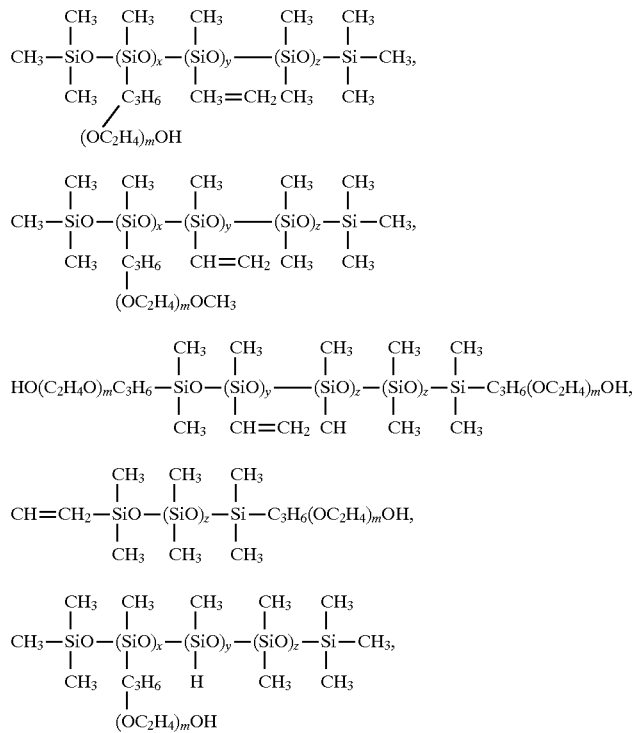

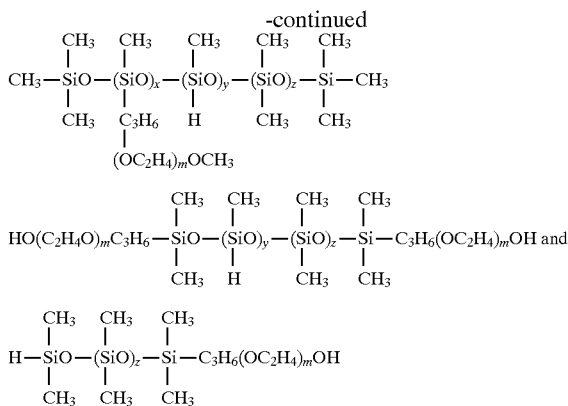

In the preceding formulas, m is an integer with a value of 2 to 100, x is a positive integer, y is a positive integer, and z is zero or a positive integer.

Component (ii) is a polyoxyalkylene compound with the general formula

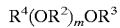

in which $R^2$, $R^3$, and m are as defined above. $R^4$ in the preceding formula is an alkenyl radical having 2 to 20 carbon atoms and is exemplified by vinyl, allyl, butenyl, pentenyl, and hexenyl. Component (ii) is exemplified by polyoxyalkylene compounds with the following general formulas.

$CH_2=CH(OC_2H_4)_mOH$,
$CH_2=CH(OC_2H_4)_mOCH_3$,
$CH_2=CHCH_2(OC_2H_4)_mOH$,
$CH_2=CHCH_2(OC_2H_4)_mOCH_3$,
$CH_2=CH(OC_2H_4)_n(OC_3H_6)_pOH$,
$CH_2=CH(OC_2H_4)_n(OC_3H_6)_pOCH_3$,
$CH_2=CHCH_2(OC_2H_4)_n(OC_3H_6)_pOH$, and
$CH_2=CHCH_2(OC_2H_4)_n(OC_3H_6)_pOCH_3$ in which m is an integer with a value of 2 to 100, n is zero or a positive integer, p is a positive integer, and (n+p) is an integer with a value of 2 to 100.

Component (C) is added at a level of 0.001 to 20 weight parts per 100 weight parts component (A). A satisfactory hydrophilicity cannot be imparted to the ultimately obtained silicone rubber powder when component (C) is added at less than 0.001 weight part per 100 weight parts component (A). The addition of more than 20 weight parts component (C) per 100 weight parts component (A) will cause the ultimately obtained silicone rubber powder to be tacky or sticky. When component (i) according to the second embodiment is used as component (C), it is preferably added at from 0.01 to 20 weight parts per 100 weight parts component (A). When component (ii) is used as component (C), it is preferably added at from 0.001 to 10 weight parts per 100 weight parts component (A).

The platinum catalyst (D) is a catalyst for the cure of the subject silicone rubber composition and is exemplified by chloroplatinic acid, alcohol solutions of chloroplatinic acid, olefin complexes of platinum, platinum/alkenylsiloxane complexes, platinum-on-silica micropowder, platinum-on-active carbon micropowder, and platinum black.

Component (D) is added in a quantity sufficient to cure the silicone rubber composition. For example, component (D) is preferably added in a quantity that provides 0.1 to 1,000 weight-ppm (parts per million) and more preferably 1 to 500 weight-ppm, platinum metal in component (D) based on the total weight of components (A) and (B).

As optional components, the subject silicone rubber composition can contain, for example, inorganic filler such as fumed silica, precipitated silica, quartz powder, fused silica, titanium dioxide, talc, mica, carbon black, and so forth; the aforesaid inorganic fillers after surface treatment with an organosilicon compound such as organoalkoxysilane, organochlorosilane, organosilazane, and so forth; addition-reaction inhibitors such as alkyne alcohols (e.g., 3-methyl-1-butyn-3-ol, 3,5-dimethyl-1-hexyn-3-ol, phenylbutynol, and so forth), ene-yne compounds (e.g., 3-methyl-3-penten-1-yne, 3,5-dimethyl-3-hexen-1-yne, and so forth), 1,3,5,7-tetramethyl-1,3,5,7tetravinylcyclotetrasiloxane, 1 ,3,5,7-tetramethyl- 1,3,5,7-tetrahexenylcyclotetrasiloxane, benzotriazole, and so forth; preservatives; antimicrobials; antioxidants; fragrances; pigments; and dyes. At least 1 inorganic filler selected from talc, mica, and fused silica is preferably added in order to adjust the specific gravity of the silicone rubber powder. The specific gravity of the silicone rubber powder is preferably from 0.97 to 1.20 and more preferably from 0.97 to 1.10. As a consequence, these inorganic fillers are preferably added at less than 100 weight parts and particularly preferably at from 0.01 to 20 weight parts, in each case per 100 weight parts component (A). Addition-reaction inhibitor as described above is preferably admixed in order to improve the handling characteristics of the silicone rubber composition. The addition-reaction inhibitor is preferably added at from 10 to 50,000 weight-ppm in the silicone rubber composition.

The silicone rubber powder according to the present invention is highly hydrophilic and has a soft feel and as a consequence can be used as the scrub agent in cleansing facial cosmetics and so forth, as well as in, for example, waterborne paints, waterborne cosmetics, waterborne cleaners, and waterborne lustrants.

EXAMPLES

The silicone rubber powder according to the present invention and its method of preparation will be explained in greater detail by the working examples that follow. The viscosity values reported in the examples were measured at 25° C. The silicone rubber powder, its hydrophilicity, and its feel were evaluated as follows.

Average Particle Size of the Silicone Rubber Powder

The average particle size was determined from the weights of silicone rubber powder passing through a series of sieves having different apertures.

Maximum Particle Size of the Silicone Rubber Powder

This was determined by inspection of the electron micrograph.

Particle Size Analysis of the Silicone Rubber Powder

The content (weight %) of silicone rubber powder with a particle size from 50 micrometers to 250 micrometers was determined.

Hydrophilicity of the Silicone Rubber Powder

A waterborne dispersion was prepared from 100 weight parts of the silicone rubber powder, 4 weight parts polyoxyethylene nonylphenyl ether (HLB=13.1), and 1,000 weight parts ion-exchanged water. The waterborne dispersion was then held at quiescence at room temperature for 1 week, after which its status was inspected. A score of "good" was rendered when the silicone rubber powder did not aggregate in the waterborne dispersion and was easily redispersible. A score of "poor" was rendered when the silicone rubber powder had become aggregated in the waterborne dispersion and could not be redispersed.

Feel of the Silicone Rubber Powder

The above-described waterborne dispersion was applied on the hands. A score of "++" was rendered when the silicone rubber powder had a soft feel. A score of "+" was rendered when the silicone rubber powder occasionally had an uncomfortable, unnatural feel. A score of "x" was rendered when the silicone rubber powder had an uncomfortable, unnatural feel and felt strongly irritating.

Example 1

The following were mixed to homogeneity to give an addition-reaction curing silicone rubber composition: 100 weight parts of dimethylvinylsiloxy-endblocked polydimethylsiloxane with a viscosity of 100 centistokes, a trimethylsiloxy-endblocked polymethylhydrogensiloxane in a quantity that provided 0.85 mole silicon-bonded hydrogen per 1 mole of vinyl in the dimethylvinylsiloxy-endblocked polydimethylsiloxane, an isopropanolic chloroplatinic acid solution in a quantity that provided 5 weight-ppm platinum metal based on the combined quantity of the preceding siloxanes, 1 weight part of a polyoxyethylene-functional polymethylsiloxane with the formula

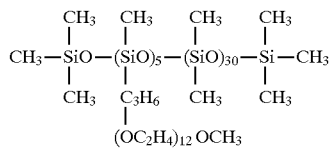

and 10 weight parts of a polymethylhydrogensiloxane-treated mica with an average particle size of approximately 4 micrometers.

Silicone rubber was molded by heating this silicone rubber composition at 150° C. for 30 minutes. The durometer (JIS A) and specific gravity of the silicone rubber were measured, and the silicone rubber was then pulverized using a hammer mill having a rotation radius of 20 cm to give a silicone rubber powder. The properties of the silicone rubber powder are reported in Table 1.

Example 2

The following were mixed to homogeneity to give an addition-reaction curing silicone rubber composition: 100 weight parts of dimethylvinylsiloxy-endblocked polydimethylsiloxane with a viscosity of 500 centistokes, of polymethylsiloxane with the average unit formula

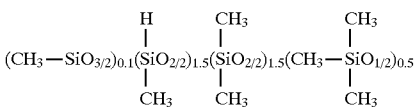

in a quantity that provided 0.95 mole silicon-bonded hydrogen per 1 mole of vinyl in the dimethylvinylsiloxy-endblocked polydimethylsiloxane, an isopropanolic chloroplatinic acid solution in a quantity that provided 10 weight-ppm platinum metal based on the combined quantity of the preceding siloxanes, 0.5 weight part of a polyoxyethylene-functional polymethylsiloxane with the formula

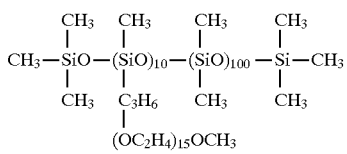

and 14 weight parts of a polymethylhydrogensiloxane-treated talc with an average particle size of approximately 0.5 micrometer.

Silicone rubber was molded by heating this silicone rubber composition at 150° C. for 30 minutes. The durometer and specific gravity of the silicone rubber were measured, and the rubber then pulverized, as described in Example 1. The properties of the silicone rubber powder are reported in Table 1.

Example 3

The following were mixed to homogeneity to give an addition-reaction curing silicone rubber composition: 100 weight parts of dimethylvinylsiloxy-endblocked polydimethylsiloxane with a viscosity of 500 centistokes, a trimethylsiloxy-endblocked polymethylhydrogensiloxane in a quantity that provided 1.2 moles silicon-bonded hydrogen per 1 mole of vinyl in the dimethylvinylsiloxy-endblocked polydimethylsiloxane, an isopropanolic chloroplatinic acid solution in a quantity that provided 5 weight-ppm platinum metal based on the combined quantity of the preceding siloxanes, 1 weight part of a polyoxyethylene-functional polymethylsiloxane with the formula

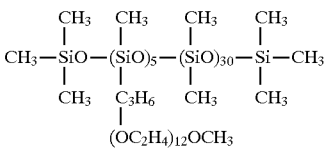

and 10 weight parts of a polymethylhydrogensiloxane-treated mica with an average particle size of approximately 4 micrometers.

Silicone rubber was molded, tested and then pulverized, as described in Example 1. The properties of the silicone rubber powder are reported in Table 1.

Example 4

The following were mixed to homogeneity to give an addition-reaction curing silicone rubber composition: 100 weight parts of dimethylvinylsiloxy-endblocked polydimethylsiloxane with a viscosity of 100 centistokes, a trimethylsiloxy-endblocked polymethylhydrogensiloxane in a quantity that provided 0.85 mole silicon-bonded hydrogen per 1 mole of vinyl in the dimethylvinylsiloxy-endblocked polydimethylsiloxane, an isopropanolic chloroplatinic acid solution in a quantity that provided 10 weight-ppm platinum metal based on the combined quantity of the preceding siloxanes, 1 weight part of a polyoxyethylene-functional polymethylsiloxane with the formula

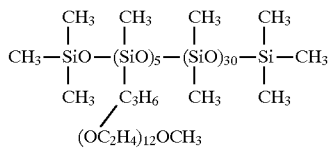

and 10 weight parts of a polymethylhydrogensiloxane-treated fused silica with an average particle size of approximately 5 micrometers.

Silicone rubber was molded, tested and then pulverized as described in Example 1. The properties of the silicone rubber powder are reported in Table 1.

Comparative Example 1

The following were mixed to homogeneity to give an addition-reaction curing silicone rubber composition: 100 weight parts of dimethylvinylsiloxy-endblocked polydimethylsiloxane with a viscosity of 100 centistokes, trimethylsiloxy-endblocked polymethylhydrogensiloxane in a quantity that provided 1.20 moles silicon-bonded hydrogen per 1 mole of vinyl in the dimethylvinylsiloxy-endblocked polydimethylsiloxane, an isopropanolic chloroplatinic acid solution in a quantity that provided 5 weight-ppm platinum metal based on the combined quantity of the preceding siloxanes, and 10 weight parts of a polymethylhydrogensiloxane-treated mica with an average particle size of approximately 4 micrometers.

Silicone rubber was molded, tested and then pulverized according to the methods of Example 1. The properties of the silicone rubber powder are reported in Table 1.

Comparative Example 2

The following were mixed to homogeneity to give an addition-reaction curing silicone rubber composition: 100 weight parts of dimethylvinylsiloxy-endblocked polydimethylsiloxane with a viscosity of 100 centistokes, of trimethylsiloxy-endblocked polymethylhydrogensiloxane in a quantity that provided 1.20 moles silicon-bonded hydrogen per 1 mole of vinyl in the dimethylvinylsiloxy-endblocked polydimethylsiloxane, an isopropanolic chloroplatinic acid solution in a quantity that provided 5 weight-ppm platinum metal based on the combined quantity of the preceding siloxanes, and 10 weight parts of a polymethylhydrogensiloxane-treated mica with an average particle size of approximately 4 micrometers.

This composition was rapidly mixed into 200 weight parts of pure water (electrical conductivity=0.2 microS/cm) at 25° C. and 4 weight parts of a polyoxyethylene-functional polymethylsiloxane with the following formula.

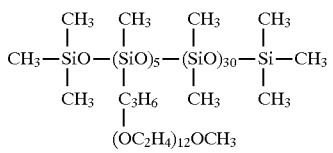

A homogeneous waterborne emulsion of the addition-reaction curing silicone rubber composition was then prepared using an homogenizer (300 kgf/cm²). This waterborne emulsion was held for 6 hours at 30° C. to give a waterborne dispersion of silicone rubber powder. This waterborne dispersion was heated at 80° C. for 1 hour, which, however, produced a large amount of a gel-like material. After this gel-like material had been filtered off with a sieve (150 mesh), a silicone rubber powder was prepared by drying through a spray drier. The properties of the silicone rubber powder are reported in Table 1.

TABLE 1

|  | present invention | | | | comparative examples | |
| --- | --- | --- | --- | --- | --- | --- |
|  | Ex. 1 | Ex. 2 | Ex. 3 | Ex. 4 | Comp. Ex. 1 | Comp. Ex. 2 |
| properties of the silicone rubber powders | | | | | | |
| JIS A durometer | 32 | 40 | 34 | 36 | 53 | 53 |
| specific gravity | 1.04 | 1.03 | 1.02 | 1.05 | 1.03 | 1.03 |
| average particle size (micrometers) | 74 | 74 | 74 | 74 | 53 | 12 |
| maximum particle size (micrometers) | 180 | 210 | 150 | 180 | 100 | 200 |
| partice size analysis (%) | 92 | 95 | 88 | 86 | 42 | 8 |
| hydrophilicity of the silicone rubber powders | good | good | good | good | poor | poor |
| feel of the silicone rubber powders | ++ | ++ | ++ | ++ | + | x |

Example 5

The following were mixed to homogeneity to give an addition-reaction curing silicone rubber composition: 100 weight parts of a dimethylvinylsiloxy-endblocked polydimethylsiloxane with a viscosity of 100 centistokes, a trimethylsiloxy-endblocked polymethylhydrogensiloxane in a quantity that provided 0.85 mole silicon-bonded hydrogen per 1 mole of vinyl in the composition, an isopropanolic chloroplatinic acid solution in a quantity that provided 5 weight-ppm platinum metal based on the combined quantity of the preceding siloxanes, 4 weight parts of a polyoxyethylene-functional polymethylsiloxane with the formula

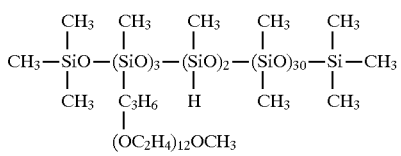

and 10 weight parts of a polymethylhydrogensiloxane-treated mica with an average particle size of approximately 4 micrometers.

Silicone rubber was molded, tested and then pulverized, as described in Example 1. The properties of the silicone rubber powder are reported in Table 2.

Example 6

The following were mixed to homogeneity to give an addition-reaction curing silicone rubber composition: 100 weight parts of a dimethylvinylsiloxy-endblocked polydimethylsiloxane with a viscosity of 500 centistokes, a polymethylsiloxane with the average unit formula

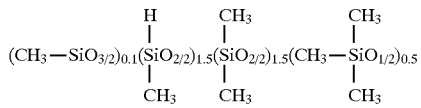

in a quantity that provided 0.95 mole silicon-bonded hydrogen per 1 mole of vinyl in the composition, an isopropanolic chloroplatinic acid solution in a quantity that provided 10 weight-ppm platinum metal based on the combined quantity of the preceding siloxanes, 0.5 weight part of a polyoxyethylene-functional polymethylsiloxane with the formula

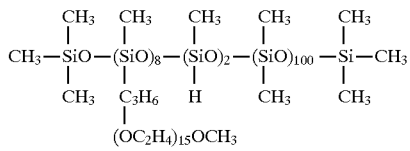

and 14 weight parts of a polymethylhydrogensiloxane-treated talc with an average particle size of approximately 0.5 micrometer.

Silicone rubber was molded, tested and then pulverized, as described in Example 1. The properties of the silicone rubber powder are reported in Table 2.

Example 7

The following were mixed to homogeneity to give an addition-reaction curing silicone rubber composition: 100 weight parts of a dimethylvinylsiloxy-endblocked polydimethylsiloxane with a viscosity of 100 centistokes, 1 weight part of a polyoxyethylene compound with the formula

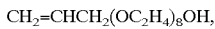

a trimethylsiloxy-endblocked polymethylhydrogensiloxane in a quantity that provided 0.90 mole silicon-bonded hydrogen per 1 mole of the total amount of vinyl and allyl in the composition, an isopropanolic chloroplatinic acid solution in a quantity that provided 5 weight-ppm platinum metal based on the combined quantity of the preceding siloxanes, and 10 weight parts of a polymethylhydrogensiloxane-treated mica with an average particle size of approximately 4 micrometers.

Silicone rubber was molded, tested and then pulverized, as described in Example 1. The properties of the silicone rubber powder are reported in Table 2.

Example 8

The following were mixed to homogeneity to give an addition-reaction curing silicone rubber composition: 100 weight parts of a dimethylvinylsiloxy-endblocked polydimethylsiloxane with a viscosity of 500 centistokes, 0.2 weight part of a polyoxyethylene compound with the formula

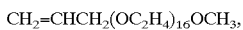

a polymethylsiloxane with the average unit formula

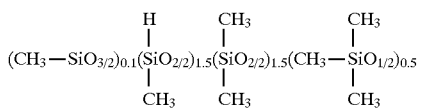

in a quantity that provided 1.00 mole silicon-bonded hydrogen per 1 mole of the total amount of vinyl and allyl in the composition, an isopropanolic chloroplatinic acid solution in a quantity that provided 10 weight-ppm platinum metal based on the combined quantity of the preceding siloxanes, and 14 weight parts of a polymethylhydrogensiloxane-treated talc with an average particle size of approximately 0.5 micrometer.

Silicone rubber was molded, tested and then pulverized, as described in Example 1. The properties of the silicone rubber powder are reported in Table 2.

Example 9

The following were mixed to homogeneity to give an addition-reaction curing silicone rubber composition: 100 weight parts of a dimethylvinylsiloxy-endblocked polydimethylsiloxane with a viscosity of 500 centistokes, 1 weight part of a polyoxyethylene compound with the formula

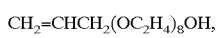

a trimethylsiloxy-endblocked polymethylhydrogensiloxane in a quantity that provided 1.30 moles silicon-bonded hydrogen per 1 mole of the total amount of vinyl and allyl in the composition, an isopropanolic chloroplatinic acid solution in a quantity that provided 5 weight-ppm platinum metal based on the combined quantity of the preceding siloxanes, and 10 weight parts of a polymethylhydrogensiloxane-treated mica with an average particle size of approximately 4 micrometers.

Silicone rubber was molded, tested and then pulverized, as described in Example 1. The properties of the silicone rubber powder are reported in Table 2.

Example 10

The following were mixed to homogeneity to give an addition-reaction curing silicone rubber composition: 100 weight parts of a dimethylvinylsiloxy-endblocked polydimethylsiloxane with a viscosity of 100 centistokes, 1 weight part of a polyoxyethylene compound with the formula

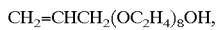

a trimethylsiloxy-endblocked polymethylhydrogensiloxane in a quantity that provided 0.90 mole silicon-bonded hydrogen per 1 mole of the total amount of vinyl and allyl in the composition, an isopropanolic chloroplatinic acid solution in a quantity that provided 5 weight-ppm platinum metal based on the combined quantity of the preceding siloxanes, and 10 weight parts of a polymethylhydrogensiloxane-treated fused silica with an average particle size of approximately 5 micrometers.

Silicone rubber was molded, tested and then pulverized, as described in Example 1. The properties of the silicone rubber powder are reported in Table 2.

Comparative Example 3

The following were mixed to homogeneity to give an addition-reaction curing silicone rubber composition: 100 weight parts of a dimethylvinylsiloxy-endblocked polydimethylsiloxane with a viscosity of 100 centistokes, a trimethylsiloxy-endblocked polymethylhydrogensiloxane in a quantity that provided 1.20 moles silicon-bonded hydrogen per 1 mole of vinyl in the dimethylvinylsiloxy-endblocked polydimethylsiloxane, an isopropanolic chloroplatinic acid solution in a quantity that provided 5 weight-ppm platinum metal based on the combined quantity of the preceding siloxanes, and 10 weight parts of a polymethylhydrogensiloxane-treated mica with an average particle size of approximately 4 micrometers. This composition was rapidly mixed into 200 weight parts pure water (electrical conductivity=0.2 microS/cm) at 25° C. and 4 weight parts of a polyoxyethylene nonylphenyl ether (HLB= 13.1). A homogeneous waterborne emulsion of the silicone rubber composition was then prepared using an homogenizer (300 kgf/cm²). This waterborne emulsion was held for 6 hours at 30° C. to give a waterborne dispersion of silicone rubber powder. This waterborne dispersion was heated at 80° C. for 1 hour and then dried through a spray dryer to give a silicone rubber powder. The properties of the silicone rubber powder are reported in Table 2.

selected from the group consisting of ethylene oxide units, propylene oxide units and combinations of these units.

5. The silicone rubber powder according to claim 4, wherein said polyorganosiloxane is polydimethylsiloxane.

6. The silicone rubber powder according to claim 5, wherein $R^1$ is selected from the group consisting of ethylene and propylene and $R^3$ is selected from the group consisting of hydrogen, methyl, ethyl and propyl.

7. A method for preparing a silicone rubber powder, said method comprising:

(I) curing a curable silicone composition comprising a polyorganosiloxane which contains at least one silicon-bonded polyoxyalkylene group of the formula $$—R^1(OR^2)_mOR^3$$

wherein $R^1$ is an alkylene radical having 1 to 20 carbon atoms, $R^2$ is an alkylene radical having 1 to 20 carbon atoms, $R^3$ is selected from the group consisting of hydrogen and alkyl radical having 1 to 10 carbon atoms and m is an integer having a value of 2 to 100 to provide a cured silicone rubber; and

TABLE 2

|  | present invention | | | | | | comparative examples | |
| --- | --- | --- | --- | --- | --- | --- | --- | --- |
|  | Ex. 5 | Ex. 6 | Ex. 7 | Ex. 8 | Ex. 9 | Ex. 10 | Comp. Ex. 1 | Comp. Ex. 3 |
| properties of the silicone rubber powders | | | | | | | | |
| JIS A durometer | 32 | 40 | 31 | 41 | 37 | 35 | 53 | 53 |
| specific gravity | 1.04 | 1.03 | 1.04 | 1.03 | 1.02 | 1.05 | 1.03 | 1.03 |
| average particle size (micrometers) | 74 | 74 | 74 | 74 | 74 | 74 | 53 | 15 |
| maximum particle size (micrometers) | 180 | 210 | 180 | 210 | 150 | 180 | 100 | 150 |
| particle size analysis (%) | 92 | 95 | 91 | 96 | 89 | 88 | 42 | 20 |
| hydrophilicity of the silicone rubber powders | good | good | good | good | good | good | poor | poor |
| feel of the silicone rubber powders | ++ | ++ | ++ | ++ | ++ | ++ | + | + |

That which is claimed is:

1. A cured silicone rubber powder prepared from a curable silicone composition, said powder comprising a polyorganosiloxane chain having at least one silicon-bonded polyoxyalkylene group of the formula $$—R^1(OR^2)_mOR^3$$

wherein $R^1$ is an alkylene radical having 1 to 20 carbon atoms, $R^2$ is an alkylene radical having 1 to 20 carbon atoms, $R^3$ is selected from the group consisting of hydrogen and alkyl radicals having 1 to 10 carbon atoms and m is an integer having a value of 2 to 100.

2. The silicone rubber powder according to claim 1, wherein said curable silicone composition further comprises an inorganic filler.

3. The silicone rubber powder according to claim 2, wherein said inorganic filler is selected from the group consisting of talc, mica, fused silica and combinations thereof.

4. The silicone rubber powder according to claim 1, wherein said oxyalkylene group comprises repeat units (II) pulverizing said cured silicone rubber.

8. The method according to claim 7, wherein said cured silicone rubber is obtained by curing an addition reaction-curable silicone composition.

9. The method according to claim 8, wherein said addition reaction-curable silicone composition comprises:

(A) 100 parts by weight of a polyorganosiloxane that contains at least 2 silicon-bonded alkenyl groups in each molecule;

(B) a polyorganosiloxane containing at least 2 silicon-bonded hydrogen atoms in each molecule, in a quantity that provides 0.1 to 10 moles of silicon-bonded hydrogen from component (B) for each mole of alkenyl in component (A);

(C) 0.001 to 20 parts by weight of a polyorganosiloxane that is free of silicon-bonded alkenyl and free of silicon-bonded hydrogen and that contains at least one silicon-bonded polyoxyalkylene group of the formula $$—R^1(OR^2)_mOR^3$$

wherein $R^1$ is an alkylene radical having 1 to 20 carbon atoms, $R^2$ is an alkylene radical having 1 to 20 carbon atoms, $R^3$ is selected from the group consisting of hydrogen and alkyl having 1 to 10 carbon atoms and m is an integer having a value of 2 to 100; and (D) a platinum catalyst in sufficient quantity to cure said additional reaction-curable silicone composition.

10. The method according to claim 9, wherein said oxyalkylene group comprises repeat units selected from the group consisting of ethylene oxide units, propylene oxide units and combinations of these units.

11. The method according to claim 10, wherein said polyorganosiloxane (C) is polydimethylsiloxane.

12. The method according to claim 11, wherein $R^1$ is selected from the group consisting of ethylene and propylene and $R^3$ is selected from the group consisting of hydrogen, methyl, ethyl and propyl.

13. The method according to claim 8, wherein said addition reaction-curable silicone composition comprises:

(A) 100 parts by weight of a polyorganosiloxane that contains at least 2 silicon-bonded alkenyl groups in each molecule;

(B) a polyorganosiloxane containing at least 2 silicon-bonded hydrogen atoms in each molecule, in a quantity that provides 0.1 to 10 moles of silicon-bonded hydrogen from component (B) for each mole of alkenyl in said curable silicone composition;

(C) 0.001 to 20 parts by weight of a polyoxyalkylene-containing component selected from the group consisting of (i) a polyorganosiloxane that contains silicon-bonded alkenyl or silicon-bonded hydrogen and that also contains at least one silicon-bonded polyoxyalkylene group of the formula —$R^1(OR^2)_mOR^3$ wherein $R^1$ is an alkylene radical having 1 to 20 carbon atoms, $R^2$ is an alkylene radical having 1 to 20 carbon atoms, $R^3$ is selected from the group consisting of hydrogen and alkyl radicals having 1 to 10 carbon atoms and m is an integer having a value of 2 to 100 and (ii) a polyoxyalkylene compound having the formula $R^4(OR^2)_mOR^3$ wherein $R^2$ is an alkylene radical having 1 to 20 carbon atoms, $R^3$ is selected from the group consisting of hydrogen and alkyl radical having 1 to 10 carbon atoms, $R^4$ is an alkenyl radical having 2 to 20 carbon atoms and m is an integer having a value of 2 to 100; and (D) a platinum catalyst in sufficient quantity to cure the addition reaction-curable composition.

14. The method according to claim 13, wherein said oxyalkylene group comprises repeat units selected from the group consisting of ethylene oxide units, propylene oxide units and combinations of these units.

15. The method according to claim 14, wherein said polyorganosiloxane (C) is polydimethylsiloxane.

16. The method according to claim 15, wherein $R^1$ is selected from the group consisting of ethylene and propylene and $R^3$ is selected from the group consisting of hydrogen, methyl, ethyl and propyl.

17. The method according to claim 13, wherein said polyorganosiloxane (C) is a polyoxyalkylene-containing component having a formula selected from the group consisting of $CH_2=CH(OC_2H_4)_mOH$,
$CH_2=CH(OC_2H_4)_mOCH_3$,
$CH_2=CHCH_2(OC_2H_4)_mOH$,
$CH_2=CHCH_2(OC_2H_4)_mOCH_3$,
$CH_2=CH(OC_2H_4)_n(OC_3H_6)_pOH$,
$CH_2=CH(OC_2H_4)_n(OC_3H_6)_pOCH_3$,
$CH_2=CHCH_2(OC_2H_4)_n(OC_3H_6)_pOH$, and
$CH_2=CHCH_2(OC_2H_4)_n(OC_3H_6)_pOCH_3$ in which m is an integer with a value of 2 to 100, n is zero or a positive integer, p is a positive integer, and (n+p) is an integer having a value of 2 to 100.

18. A cured silicone rubber powder prepared by a method comprising:

(I) curing a curable silicone composition comprising a polyorganosiloxane which contains at least one silicon-bonded polyoxyalkylene group of the formula —$R^1(OR^2)_mOR^3$ wherein $R^1$ is an alkylene radical having 1 to 20 carbon atoms, $R^2$ is an alkylene radical having 1 to 20 carbon atoms, $R^3$ is selected from the group consisting of hydrogen and alkyl radical having 1 to 10 carbon atoms and m is an integer having a value of 2 to 100 to provide a cured silicone rubber; and (II) pulverizing said cured silicone rubber.

* * * * *